July 19, 1949.  L. B. BRAGG ET AL  2,476,280
APPARATUS FOR THE DISTILLATION AND FRACTIONATION OF
COMPOSITE LIQUIDS AND CONTROL MEANS THEREFOR
Original Filed April 22, 1941  5 Sheets-Sheet 1

INVENTORS
LESLIE B. BRAGG
CHARLES A. SCHWARZLER
CUTHBERT J. BROWN
BY Lee Allan Swem
ATTORNEY July 19, 1949.  L. B. BRAGG ET AL  2,476,280
APPARATUS FOR THE DISTILLATION AND FRACTIONATION OF
COMPOSITE LIQUIDS AND CONTROL MEANS THEREFOR
Original Filed April 22, 1941  5 Sheets-Sheet 4

INVENTORS
LESLIE B. BRAGG
CHARLES A. SCHWARZLER
CUTHBERT J. BROWN.
BY Lee Allan Swem
ATTORNEY INVENTORS
LESLIE B. BRAGG
CHARLES A. SCHWARZLER
CUTHBERT J. BROWN.
BY Lee Allan Swem
ATTORNEY Patented July 19, 1949

2,476,280

UNITED STATES PATENT OFFICE 2,476,280

APPARATUS FOR THE DISTILLATION AND FRACTIONATION OF COMPOSITE LIQUIDS AND CONTROL MEANS THEREFOR

Leslie B. Bragg, Scotch Plains, N. J., and Charles A. Schwarzler and Cuthbert J. Brown, Foxboro, Mass., assignors to Foster Wheeler Corporation, New York, N. Y., a corporation of New York Continuation of application Serial No. 389,756, April 22, 1941. This application May 10, 1944, Serial No. 534,974

10 Claims. (Cl. 196—132)

This invention relates to the distillation and fractionation of composite liquids such as hydrocarbon oils and the like, and more particularly pertains to methods and apparatus for the batch distillation of such liquids and to control means therefor.

With batch distillation apparatus including a shell still and a fractionating column into which the vapors evolved in the still are introduced, the vapors leaving the still will be rich in the lightest boiling constituents of the charge at the beginning of the distillation operation, and will become poorer in the lighter constituents and richer in the heavier constituents of the charge as the distillation progresses. With an efficient fractionating column, when distillation begins, the vapors at the top of the column will consist of the lightest boiling constituents of the charge in an almost pure state, and as the distillation progresses, the lightest constituents will be removed from the charge in the still, and eventually a transition point will be reached at which the light constituents are substantially all removed, and the temperature at the top of the column will rise quickly to the boiling temperature of the next heavier constituent.

With batch distillation apparatus employing a condenser at the top of the column which totally condenses the vapors leaving the column, and with the condensate returned to distributing means at the top of the column, it is possible to remove the overhead products stream from the distributing means by a pump through a cooler and a flow recorder controller. By regulating the rate of removal of the overhead stream through the pump, and with a fixed rate of heat input and constant rate of vaporization in the still, it is possible to regulate the reflux ratio within the fractionating column at will. The first product removed will be almost pure product having a boiling point substantially that of the pure lightest constituents in the charge. As distillation continues and the lightest constituents in the charge become less concentrated in the charge, the temperature at the top of the column will tend to rise slowly due to the fact that the column is not capable of completely removing from the vapors all of the higher boiling material. During the early stages of distillation, when the vapors from the still are rich in the lightest boiling constituent, a comparatively low ratio of liquid returned to the column to product withdrawn from the column, or a comparatively low reflux ratio, is sufficient to produce an overhead product of the desired purity. However, as vapors leaving the still become less concentrated in the lightest boiling constituents, it becomes necessary to increase the reflux ratio in order to maintain the desired degree of purity. Whatever the reflux ratio may be, as the distillation progresses the overhead product eventually will become impure to the extent that the temperature at the top of the column will tend to rise above the boiling temperature of the product of specified desired purity. In consequence, it is possible to assign a series of temperatures in the vapor stream at the top of the column or in the stream flowing from the column, which may be utilized as control indications and control temperatures for varying the reflux ratio as desired. One method of accomplishing this is by regulation of the valves in the product lines connected with the tower.

Accordingly, the invention provides a method of, and apparatus for, batch distillation of composite fluids, which utilizes the temperature at the top of a fractionating column or the temperature in the vapor stream flowing from the top of the column, as a basis for the automatic regulation of the reflux ratio in the column and for the automatic operation of the valves controlling the lines through which products flow from the column. By utilizing this method and apparatus, products of the desired degree of purity may be obtained automatically, and with a considerably smaller consumption of heat than would be required for the production of products of similar purity by previously practiced methods of operation which utilize a fixed minimum reflux ratio, or a variable reflux ratio manually controlled. The automatic control also includes automatic means for shutting down the distillation unit at the end of the batch distillation run, and in the event of high still pressure, low steam pressure, power failure or air failure, and for automatically restarting the unit.

The invention will be understood from the following description when considered in connection with the accompanying drawings forming a part thereof and in which.

Like characters of reference refer to the same or to similar parts throughout the several views.

Figure 1:
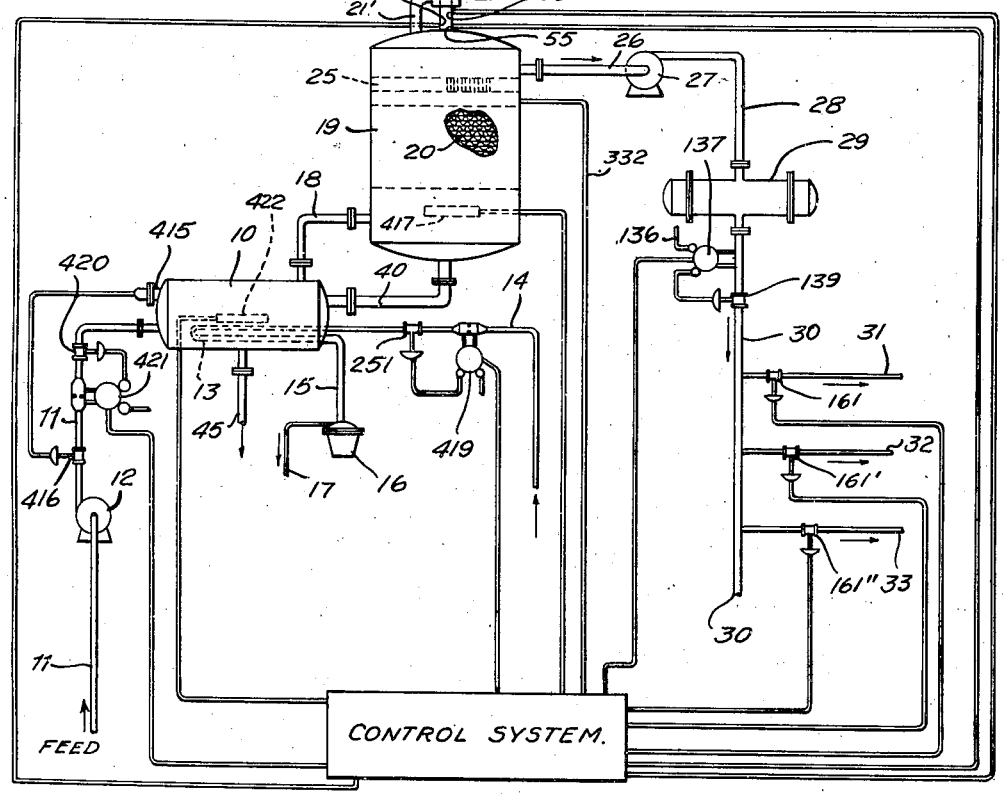
Fig. 1 is an elevational view, showing more or less diagrammatically, one form of apparatus embodying, and for carrying out, the invention.

Referring to the drawings, particularly to Fig. 1 thereof, reference character 10 designates a shell still to which heat is supplied by means of a steam coil 13 within the still, and steam is supplied to this coil through a line 14. Condensate of the steam is withdrawn from the coil through line 15 into a trap 16 and is withdrawn from the trap through line 17. The vapors evolved in the still are conducted through a transfer line 18 to the lower part of a fractionating column 19 having vapor and liquid contact apparatus 20 therein positioned above the outlet of the transfer line 18. Any suitable type of vapor and liquid contact apparatus may be utilized. In this instance, the column has packing of the type shown in Stedman United States Patent No. 2,047,444, granted July 14, 1936. Vapors leave the fractionating tower 19 through a vapor line 21 and are totally condensed in a shell and tube type of surface condenser 22 into which cooling fluid is introduced through line 23 and is withdrawn through line 24. Condensate of the vapors is returned to the top of the tower through a line 21' and is collected on a condensate collecting device 25 of any suitable form, which functions also to distribute the condensate substantially uniformly over the packing 20. A portion of the condensate collecting on the device 25 is withdrawn through a line 26 by one of pumps 27, which force it through line 28 into a product cooler 29, and the cooled condensate is delivered to line 30 from which it is withdrawn through any one of product lines 31, 32, 33, 34, 35, 36, 37 or 38, depending upon which portion of the feed stock is being condensed in the condenser 22 at the time. For simplicity in illustration, but three product lines are shown in Fig 1.

Reflux is returned to the still 10 (Fig. 2) through line 40 which connects with line 40' and line 42' which is controlled by a slop valve 42 which is by-passed by a valve controlled line 43. Line 40 also is provided with a flow indicator 44. Line 40' connects through line 41 with line 45 through which residue is withdrawn from the still. Liquid in line 39 which is to be returned to the feed tank flows through line 46 which connects with charge line 47. Line 46 is controlled by a slop valve 48 which is by-passed by a valve controlled line 49. The still is charged through line 47, pump 50, lines 51, 40', 41 and 45. Residue is withdrawn from the still through lines 45 and 41, pump 50, line 52, cooler 53 and line 54. The lines 40, 40', 41, 42', 45, 46, 47, 51 and 52 are controlled by valves as shown, which can be opened or closed to obtain the flow desired.

The still 10 will be filled with the feed stock, cold light aviation gasoline for example, to which heat will be applied by admitting steam at a constant rate to the heating coil 13. Vaporization of the feed will boil off hydrocarbon fractions progressing from light to heavy, and these will be totally condensed by condenser 22, and the rate of return of condensate as reflux will be regulated by the amount of condensate removed from the system as product through line 28. Control means are provided to regulate automatically the rate of condensate removal by temperature indication, and to duplicate the products withdrawn on succeeding runs.

Figure 6:
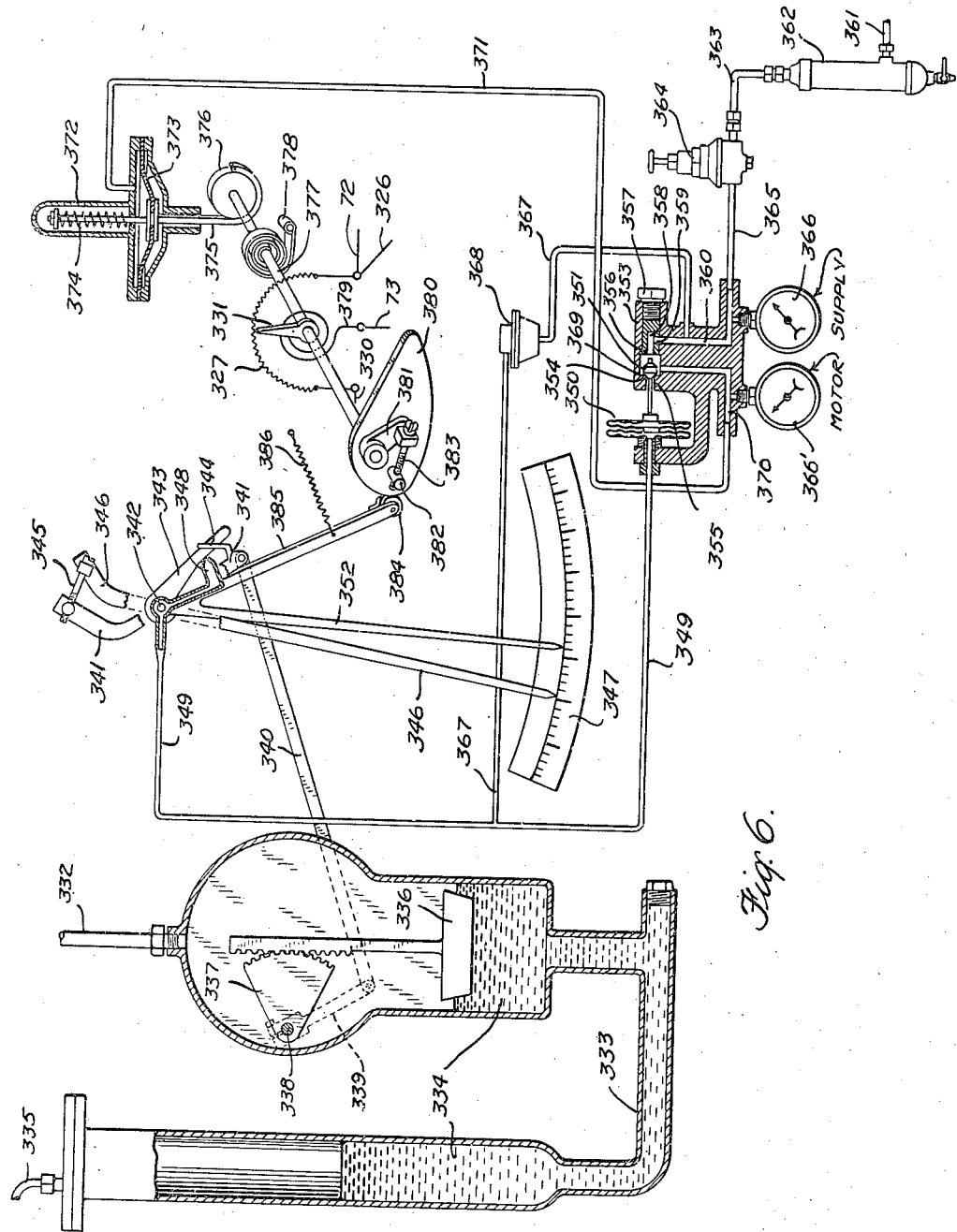
Fig. 6 is a diagrammatic view of a part of the pressure-temperature compensating device utilized in the control system.

The automatic control system is supplied with electric current from A. C. power line $L_1L_2$, Fig. 3. In general, the control system for the distillation unit includes the following: A thermometer resistance bulb 55 at the top of the column, or in the line through which vapor is conducted from the column, is connected to a Wheatstone bridge shown in Fig. 4, which is employed to measure temperature and to determine when the temperature of the vapors has reached predetermined temperatures at which the reflux ratio is to be changed or the unit cuts are to be changed from the production of one product to the production of the next succeeding product. Another thermometer resistance bulb 56 at the top of the column, (Fig. 2) or in the line through which vapors are withdrawn from the column, is utilized as a means of compensating the response of bulb 55 for variations in pressure within the distillation unit. Bulb 56 is electrically connected with a pressure-temperature compensating device 57, part of which is shown in Fig. 6 which serves the double purpose of compensating for temperature as well as for pressure, so that the response of the bulb 55 to temperature within the distillation unit is properly corrected for pressure other than normal atmospheric pressure, which is used as the basis for temperature settings on slide wire devices in the Wheatstone bridge. The heat supplied to the charge in the still is controlled by controlling the pressure and quantity of the steam supplied to coil 13 so that the rate of heating of the charge in the still will be substantially constant. The pressure controller 58 (Fig. 2) controls the pressure of the steam supplied to the heating coil and a flow controller 59 controls the quantity of steam supplied. The distillation unit is provided with a safety device so that should the steam pressure drop below the set point of the pressure controller 58, a pressure controller 60 will cause an alarm 61 to be sounded and will cause the distillation unit to be shut down automatically, otherwise unsatisfactory products might be produced during the period when the steam pressure was below the predetermined operating pressure. Another safety feature employed is a high still pressure regulator 62 which, in the event the still pressure exceeds a predetermined point, operates to sound the alarm 61 and automatically shuts down the distillation unit. In the event of power failure or instrument air failure, the distillation unit is also shut down and a suitable alarm is sounded. If the unit is shut down as a result of high still pressure, the control mechanism locks up so that the unit cannot be started again without adequate attention of the operator. If the unit is shut down automatically for other reasons, the unit starts up automatically upon the restoration of the proper conditions. A pressure controller 63 is provided which operates to vent the unit to the refinery gas system in the event the pressure within the unit tends to rise above the predetermined set pressure. There is also provided another pressure controller 64 which functions to admit either isopentane vapor or refinery gas into the unit, depending upon the stage of the operation, whenever the pressure within the unit tends to drop below a predetermined set minimum operating pressure. This latter pressure is set slightly higher than the setting of a vacuum vent safety valve on the still 10, and the controller 63 is set slightly lower than the safety controller 62 which in turn is set slightly lower than the safety valve on the still. Slop valve 42 provides means for purging the product lines of heavy distillate remaining at the end of the previous run, and the slop valve 48 serves as a means for returning to the feed tank, the small amount of improperly fractionated distillate that occurs between successive products as a result of the quantity of liquid and vapor which always remains in the fractionating column and overhead refluxing system which cannot be properly fractionated and is commonly called "hold-up."

More specifically, the thermometer resistance bulb 55 in the vapor line 21 is connected through lead 70 in one side of a Wheatstone bridge, connecting to a fixed resistance 71, Fig. 4, and through lead 72 to and through the temperature-pressure compensating device 57 to be described hereinafter in detail, to lead 73 to one pole of a galvanometer 74, and through lead 75 to a fixed resistance 76. The Wheatstone bridge also contains fixed resistances 77, 78 and 79 in series with each other and a slide wire 80' in parallel with a fixed resistance 81. The slider 82 of the slide wire 80' is connected through a single pole double throw switch 83 through lead 84 and a step switch to be described hereinafter and through lead 85 to the other pole of the galvanometer 74 through a single pole double throw switch 86 which serves to cut the galvanometer out of the circuit. The slide wire 80' together with the slider 82 and the resistances 77, 78, 79 and 81 and switch 83, constitute one of twenty-four such units which are connected in parallel in the Wheatstone bridge and are arranged to be individually and successively connected in and disconnected from the Wheatstone bridge by the step switch mentioned. A fixed resistance 87 is connected in parallel with the galvanometer. A lead 88 connects the fixed resistances 71 and 77 and a lead 89 connects the fixed resistances 76 and 79. Connected between leads 88 and 89 are the release coils 90 and 91 in series, and also connected between leads 88 and 89 are holding coils 92 and 93 in series. Current is supplied to the Wheatstone bridge from the power line $L_1L_2$ through a rectifier 94 providing preferably a 6 volt D. C. potential across the Wheatstone bridge. Fixed resistances 95 and 96 at opposite sides of the rectifier 94, serve to regulate the current flowing through the Wheatstone bridge. The Wheatstone bridge is so arranged that when the switch 83 is in position to connect lead 84 to the resistances 77 and 78, the total of resistances 78, 79 and 81 and slide wire 80' will be sufficiently greater than that of 77, so that the galvanometer 74 will deflect to high position and the step switch mentioned will cause the slide wire then in the Wheatstone bridge to be cut out of the circuit, as will be described hereinafter.

Figure 3:
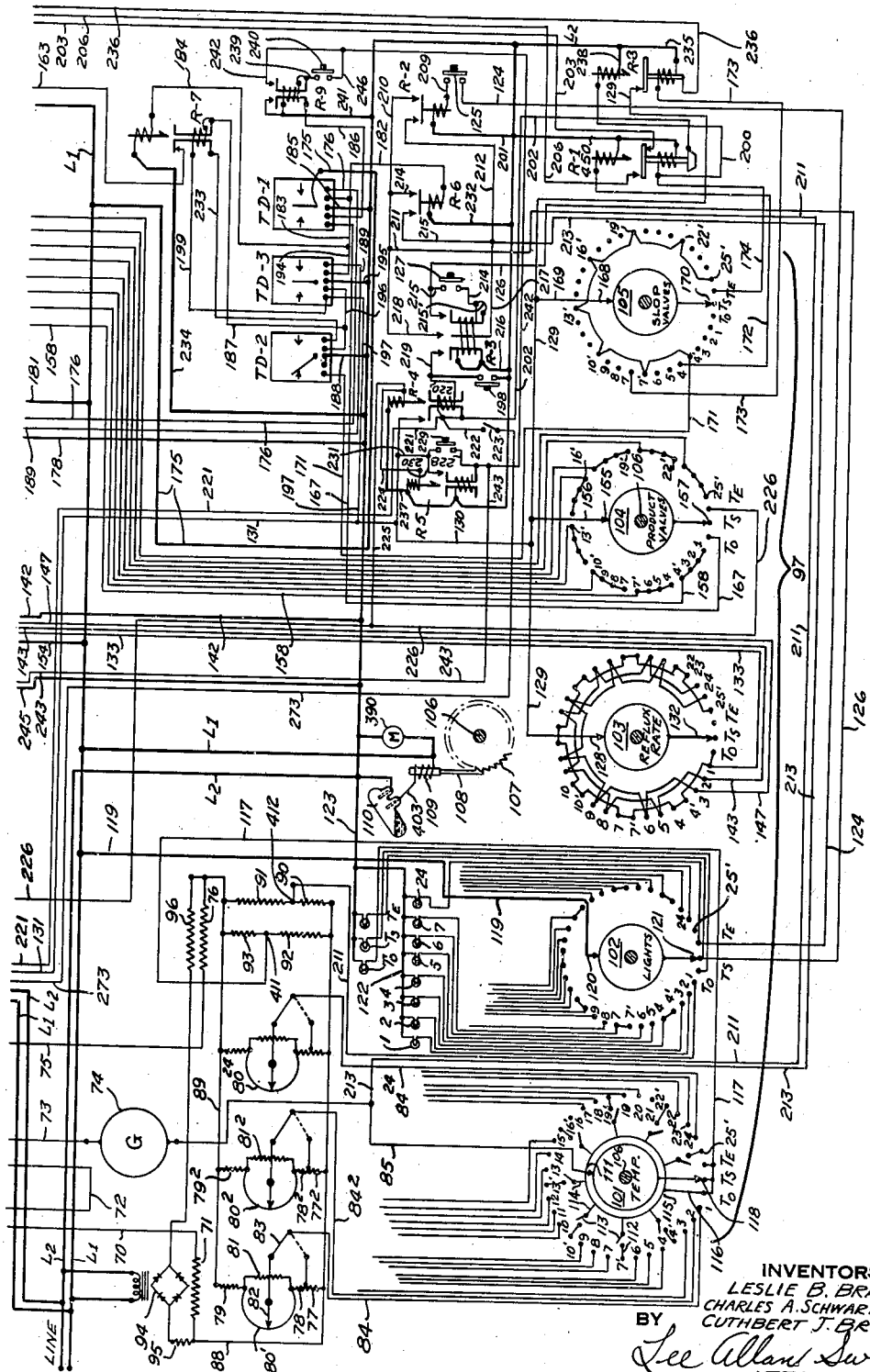
Fig. 3 shows more or less diagrammatically, another part of the control system.

The control system is provided with thirty-five control points, twenty-four of which have individual slide wires, like slide wire 80' with resistances like 77, 78, 79 and 81, and switch 83, which may be connected in the Wheatstone bridge as desired. These slide wires are connected in parallel as shown in Fig. 3, they are designated 80' to 80$^{24}$ respectively, and they are individually connected to and disconnected from the galvanometer 74 by means of a rotary step switch designated generally 97, Fig. 4. Each slide wire should have a definite temperature range, thirty degrees Fahrenheit for example, and should be graduated so that the control points can be set by positioning the sliders 82, preferably to within 0.1° F. The range of each succeeding slide wire overlaps with each preceding slide wire so that the total range of the control system is covered completely.

The rotary step switch 97 comprises five discs 101, 102, 103, 104 and 105 respectively, fixed in spaced relationship on a shaft 106, and each having a sliding contact with some point in the electric circuit of the control system and an electric contact brush which may be moved into and out of contact successively with the thirty-five control points of the system. The shaft 106 is rotated step by step by means of a ratchet 107 and a pawl 108 which is actuated by a solenoid 109, the circuit to the coil of which is controlled by a mercury switch 110, the mechanism for actuating which at the proper times will be described hereinafter.

Disc 101 which functions to connect the slide wires and the holding coils 92 and 93, successively into the Wheatstone bridge and to disconnect them from the bridge, is connected to the galvanometer 74 through lead 85 and sliding contact 111. In addition to the twenty-four control points associated with disc 101 and which are numbered 1 to 24 inclusive, there are eleven other points designated $T_E$, $T_S$, $T_O$, 4', 7', 10', 13', 16', 19', 22' and 25'. A lead line 112 connects with each point 4', 7', 10', 13', 16', 19', 22' and 25', and each lead 112 connects through a single pole, single throw switch 113 and a lead 114 to a common connection 115 which is connected through lead 116, through points $T_O$, $T_S$ and $T_E$, and lead 117 to a point 411 between the holding coils 92 and 93. The switches 113 are operated simultaneously with corresponding switches 83. A brush 118 on the disc 101 is positioned to be moved into and out of contact successively with the thirty-five control points.

Disc 102 is connected to power line $L_1$, through a lead 119 through a sliding contact 120. The disc 102 is provided with a brush 121 which is positioned to be moved into and out of contact successively with thirty-five control points corresponding to, and designated the same as, the control points associated with the disc 101. Each of control points 1 to 24 inclusive is connected to an electric lamp of the same number. The points 4', 7', 10', 13', 16', 19' and 22' have no lamps, but are connected respectively to points 4, 7, 10, 13, 16, 19 and 22. Point 25' has no connection. Each point $T_O$, $T_S$, and $T_E$ is also connected to a lamp correspondingly numbered. Lead 122 connecting one side of all the lamps 1 to 24 inclusive is connected to a lead 123 which connects with one side of the lamps $T_O$, $T_S$ and $T_E$ and to power line $L_2$. Point $T_E$ also is connected by lead 124 to a manually operated push button 125. Point $T_S$ is also connected by a lead 126 to a manually operated push button 127.

Disc 103 functions to vary the reflux rate to the column 19 as required at different stages of operation of the distillation unit. Disc 103 is connected to power line $L_1$ through sliding contact 128 and leads 129 and 130, relay R—4, lead 222, emergency switch 223 by means of which the distillation unit may be shut down completely in the event of any emergency requiring shut down, lead 273, mercury switch 271 and lead 272. This disc is provided with a brush 132 which is positioned to be moved into and out of contact successively with thirty-five control points corresponding to, and designated the same as, the control points associated with the discs 101 and 102. Control points To, 1, 4', 4, 7', 7, 10', 10, 13', 13, 16', 16, 19', 19, 22', 22 and 25' are connected together as shown in Fig. 3. Control points 2, 5, 8, 11, 14, 17, 20 and 23 are also connected together as are control points 3, 6, 9, 12, 15, 18, 21 and 24. Point 1 is connected by a lead 133 to the operating coil of a solenoid operated valve 134 in air line 135 connected at one end to an air line 136 and at the other to the control setting mechanism of a flow recorder controller 137 which receives its operating power from air line 136, and which is of any suitable type such as the Foxboro type. Controller 137 is connected to an orifice member 138 in product line 30, and controls the position of a valve 139 in the product line 30. A valve controlled by-pass 140 is provided around valve 139. The other side of the coil of valve 134 is connected to power line L₂ through leads 141 and 142. Point 2 is connected by a lead 143 to one side of the operating coil of a solenoid operated valve 144 in air line 145 which connects with air lines 135 and 136. The other side of the coil is connected to lead 142 by a lead 146. Point 3 is connected by a lead 147 to one side of the operating coil of a solenoid operated valve 148 in an air line 149 extending between air lines 135 and 136, the other side of the coil being connected to lead 142 by lead 150. A pressure reducing valve 151 is disposed in each air line 135, 145 and 149 ahead of the control valve therein and each line is provided with a pressure gage 152. An electric lamp 153 is connected in parallel with each of the coils of the valves 134, 144 and 148, and each lead 133, 143 and 147 is connected through individual switches, with a lead 154 which is a branch of power line L₁, permitting manual operation to energize the coils of valves 134, 144 and 148. The operation is such that the valves 134, 144 and 148 function to admit different predetermined air pressures to the control setting mechanism of the flow recorder controller 137 thereby to set the control points of the controller to provide three different settings of valve 139 and three different rates of flow through the product line 30 with consequent different rates of flow of reflux down column 19.

Disc 104 provides means for opening the proper product valve depending upon the stage of the operation of the distillation unit. Disc 104 is connected to power line L₁ through sliding contact 155 and leads 156, 129 and 130, relay R—4, lead 222, emergency switch 223, lead 273, mercury switch 271 and lead 272. This disc is provided with a brush 157 which is positioned to be moved into and out of contact successively with thirty-five control points corresponding to, and designated the same as, the control points associated with the discs 101, 102 and 103. As shown in Fig. 3, points 1, 2, 3 and 4' are connected together, points 4, 5, 6 and 7' also are connected together, and each succeeding group of four points are connected together. Point T_E is connected by lead 226 to the release coils of relays R—4 and R—5. Points T_E, T_S and T_O are not connected to any other control point. Points 1, 2, 3 and 4' are connected by lead 158 to the operating coil of a solenoid operated valve 159 in an air line 160 to the diaphragm of a valve 161 which controls product line 31 through which the first cut is removed from the distillation unit. When the solenoid is energized, valve 159 opens and permits air to flow to the diaphragm of valve 161 and to open it against the action of a spring which closes the valve when the solenoid is deenergized and allows the air to escape from the diaphragm. The other side of the solenoid coil is connected through leads 162 and 163 to a contact point of a relay R—7 which is arranged for mechanical lock-up, and to lead 233, to a time delay device TD—2 and lead 188 to power line L₂. Each of the other successive groups of four control points associated with the disc 104 is connected by a lead like lead 158, to the operating coil of a solenoid valve which controls the admission of air to the diaphragm of a product valve, like valve 161, in each of the product lines 32 to 38, as clearly shown in Figs. 2 and 3. An electric lamp 164 is connected in parallel with the solenoid of the valve 159 for each product line. Each lamp is connected to power line L₁ by a lead 165 having a switch 166 permitting manual operation to energize the coils of valves 159. The point To associated with disc 104 is connected through lead 167 to a time delay device TD—1 of any suitable type for the purpose, such as the vernier-set timer manufactured by the Automatic Temperature Control Co., Philadelphia, Pa.

Disc 105 provides means for operating the slop valves 42 and 48 and for controlling the opening and closing of the iso-pentane and refinery gas admission valves 208 and 205 and also for setting the control point of the column pressure regulator 63. Disc 105 is connected to power line L₁ through a sliding contact 168 and leads 169, 129 and 130, relay R—4, lead 222, emergency switch 223, lead 273, mercury switch 271 and lead 272. The disc is provided with a brush 170 which is positioned to be moved into and out of contact successively with thirty-five control points corresponding to, and designated the same as, the control points associated with the discs 101, 102, 103 and 104. Points 4', 7', 10', 13', 16', 19', 22', and 25' are connected together. No other point is connected to any other point. Point 4' and the other points connected to it, are connected through lead 171 to a time delay device TD—2 similar to TD—1. Point 4 is connected through lead 172 to the release coil of a relay R—1 having a mechanical lock-up. Point 7 is connected through lead 173 to the operating coil of a relay R—8 having a mechanical lock-up. Point T_E is connected through lead 174 to the operating coil of relay R—1 and to the release coil of relay R—8.

Time delay mechanism TD—1 functions to hold slop valve 42 open to permit a purging of the product line 26, pumps 27, product line 28, cooler 29 and product line 30 at the beginning of the run. TD—1 is connected to power line L₁ through a lead 175, and it is connected through lead 176 to the operating coil of a solenoid valve 177 which controls the supply of air to the diaphragm of slop valve 42, the coil also being connected through lead 178 to power line L₂. An electric bulb 179 is connected in parallel with the coil of the solenoid of the valve 177. Lead 176 is connected through a switch 180 and a lead 181 to power line L₁. TD—1 is also connected through lead 182 to the operating coil of relay R—6, through lead 185 to power line L₂, through lead 186 to a contact point of relay R—9 having an electrical lock-up, and through lead 167 to point T₀ associated with disc 104.

Time delay mechanism TD—2 functions to hold a valve in a product line open, after the temperature within the column has reached the set point, for a sufficient period of time to permit the product then leaving the column to reach that valve. TD—2 is connected through lead 233 to a contact point of relay R—7 and through lead 187 to the operating coil of relay R—7, through lead 188 to power line L₂, and through lead 171 to control point 4' associated with disc 105.

Time delay mechanism TD—3, similar to TD—1 and TD—2, functions to close the product valve which is open at the end of a cut and to open slop valve 48 for a sufficient period of time to permit slopping of the unsatisfactorily fractionated distillate which results from the hold-up of the column. TD—3 is connected through lead 189 to the operating coil of a solenoid valve 190 which controls the supply of air to the diaphragm of the slop valve 48, the coil also being connected through lead 191 to lead 178 and to power line L₂. A lamp 192 is connected in parallel with the coil of the solenoid of valve 190. Lead 189 also is connected through a switch 193 with lead 181 which connects to power line L₁. TD—3 also is connected through leads 194 and 184 to the release coil of relay R—7 and through leads 194, 183 and 182 to the operating coil of relay R—6, through lead 195 to power line L₂, through leads 196 and 187 to TD—2, through leads 197, 131, 130, relay R—4, lead 222, emergency switch 223, lead 273, mercury switch 271 and lead 272 to power line L₁, and through lead 199 to the operating coil of relay R—7.

Relay R—1 which is provided with a mechanical lock-up, has one side of the operating coil connected to point T₈ of disc 105 by lead 174 the other side of the coil being connected by lead 450 to power line L₂. The release coil of this relay is connected on one side to lead 172 to point 4 of disc 105 and on the other side by lead 450 to power line L₂. Relay R—1 contact points are connected by leads 202 and 222, emergency switch 223, lead 273, mercury switch 271 and lead 272 to power line L₁, and through lead 203 to the operating coil of a solenoid valve 204 which controls the admission of air to the diaphragm of valve 205 which is arranged to be opened by a spring upon failure of the air supplied through the valve 204 to the diaphragm. Relay R—1 is also connected through lead 206 to the operating coil of a solenoid valve 207 which controls the supply of air to the diaphragm of the isopentane valve 208 which is arranged to be closed by a spring upon failure of air to the valve 207 and to the diaphragm.

The operating coil or relay R—2 is connected through lead 209 to push button 125 and through lead 201 to the power line L₂. Relay R—2 contact points are connected through leads 210 and 211 to the release coils 90 and 91 of the Wheatstone bridge, and through leads 212 and 213 to lead 85 extending between the galvanometer 74 in the Wheatstone bridge and the disc 101.

The operating coil of relay R—3 is connected by lead 214 to one side of push button 127 and through lead 216 to power line L₂. The operating coil is also connected through contact points and leads 215 and 215' in parallel with push button 127 so that the relay locks up electrically after the operating coil is once energized. Another set of contact points connects the galvanometer 74 to the release coils 90 and 91 at point 412, through leads 217, 213 and 85, and 218 and 211. Relay R—3 contacts also connect power line L₂ by lead 216 through leads 219 and 220 to the operating coil of R—4.

Relay R—4 which is provided with a mechanical lock-up has one end of the operating coil connected through lead 220 to power line L₂ as described above, the other end of the coil being connected through lead 222, emergency switch 223, lead 273, mercury switch 271 and lead 272 to power line L₁. The release coil of relay R—4 is connected on one end through lead 225 and lead 226 with point T₈ on disc 104 and also to the high still pressure control relay contact point through lead 226, while on the other end it is connected to power line L₂. The contact points of relay R—4 connect line 130 through lead 222, emergency switch 223, lead 273, mercury switch 271 and lead 272 to power line L₁.

The operating coil of relay R—5 is connected through lead 228 to the push button 229 through the push button, lead 231 and through lead 130 to power line L₁ as above, the other end of the coil is connected to power line L₂. The operating coil is also connected through contacts to lead 230 and to lead 231 which is connected to lead 130 causing the relay to lock up electrically. This relay also has a mechanical lock up the release coil of which is connected in parallel with the release coil of relay R—4 by lead 224 and the extension of power line L₂. The contact points of relay R—5 are connected as above to lead 130 and also through lead 242 and lead 246 to push button 240 and through lead 243 to the starting equipment 244 for the motors for product pumps 27. The pump starter mechanism is connected to main line L₂ through lead 245.

Relay R—6 has its operating coil connected through lead 182 to time delay mechanisms TD—1 and TD—3 and through lead 232 to power line L₂. Relay R—6 contact points are connected through leads 214, 210 and 211 to release coils 90 and 91 at point 412 and through leads 215, 212, 213 and 85 to galvanometer 74.

The operating coil of relay R—7 which is provided with a mechanical lock-up, is connected through leads 187 and 196 to time delay mechanisms TD—2 and TD—3, and through lead 199 to time delay mechanism TD—3. The release coil of relay R—7 is connected through leads 184, 194, 183 and 182 to time delay mechanisms TD—1 and TD—3 and to relay R—6, and through lead 234 to power line L₂. Relay R—7 contact points are connected through lead 163 to the coils of the solenoid valves which control the supply of air to the product valves 161 and through lead 233 to time delay mechanism TD—2.

Relay R—8 which also is provided with a mechanical lock-up, has the operating coil connected through lead 173 to point 7 associated with disc 105, and to power line L₂ through lead 235. The release coil of relay R—8 is connected through lead 238 to power line L₂ and through lead 200 and lead 174 to point T₈ of disc 105. Relay R—8 contact points are connected through leads 129, 130, etc. to power line L₁ and through lead 236 to the solenoid valve 237.

Relay R—9 which is provided with an electrical lock-up has its operating coil connected through lead 239 to push button 240 and through lead 241 to power line L₂ and is locked up through the contact points connected to lead 242 in parallel with the push button. The contact points also connect the power line L2 through lead 241 and lead 186 to time delay mechanism TD—1.

Figure 2:
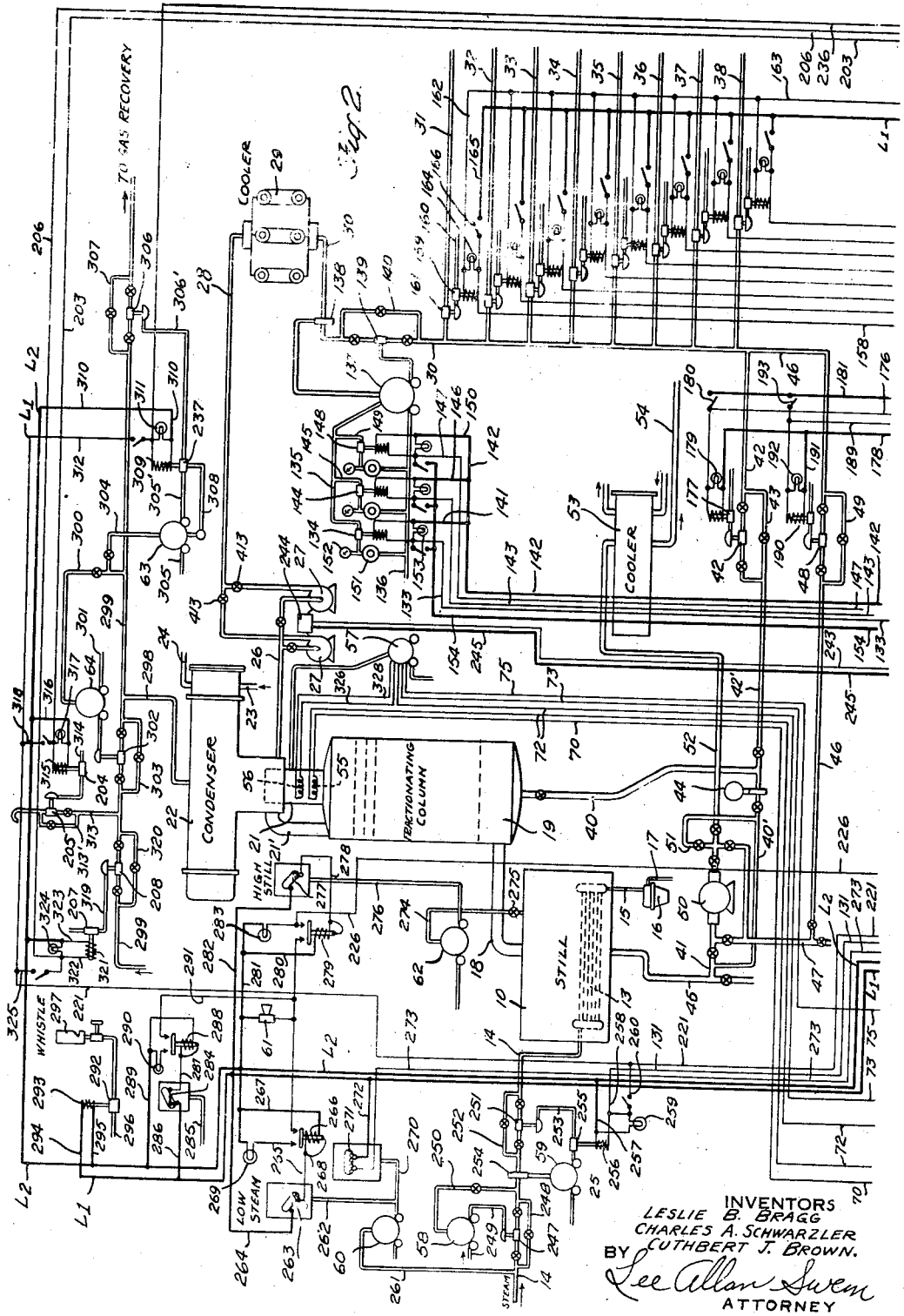
Fig. 2 is a view similar to Fig. 1 but in greater detail, showing part of the control system.

The pressure of steam supplied to heating coil 13 in still 10 is controlled by a diaphragm operated valve 247, Fig. 2, spring pressed to closed position which is by-passed by a valve controlled by-pass 248. Air is supplied to the diaphragm of valve 247 through air line 249 which is controlled by pressure indicator controller 58 connected by air line 250 to the steam line 14. The pressure indicator controller may be of any suitable type, such as that supplied by the Foxboro Company. The quantity of steam supplied through steam line 14 to the heating coil 13 is controlled by a diaphragm operated valve 251 in line 14, spring pressed to closed position which is by-passed by a valve controlled by-pass 252. Air is supplied to the diaphragm of valve 251 through air line 253 which is controlled by flow recorder controller 59 of any suitable type such as that supplied by the Foxboro Company of Foxboro, Mass. The controller 59 is connected to an orifice member 254 in the steam line 14 between valves 247 and 251. A three-way solenoid operated valve 255 is disposed in air line 253 between controller 59 and valve 251. Valve 255 is operated by a solenoid 256 admitting air to the diaphragm of valve 251 when the solenoid is energized and venting the diaphragm to the atmosphere when the solenoid is deenergized. The coil of solenoid 256 is connected by a lead 257 to power line L2 and by a lead 258 to lead 131. An electric lamp 259 is connected in parallel with the coil of solenoid 256 and is also connected through a switch controlled lead 260 to leads 221, 222, emergency switch 223, etc. to power line L1. The arrangement is such that when solenoid 256 is deenergized, the flow of air to valve 251 is cut off and it is moved to closed position thereby cutting off the supply of steam to the still 10. Solenoid 256 is deenergized to cause valve 251 to be closed on (1) completion of the batch distillation, (2) on power failure, (3) on low steam pressure, (4) on high still pressure and (5) on any other emergency shut down. Valve 251 closes due to loss of air pressure on air failure.

Pressure controller 60 of any suitable type such as supplied by the Foxboro Company, is connected to the steam line 14 through conduit 261 ahead of valves 247 and 251. Controller 60 controls the air supplied through line 262 to a pneumatically operated mercury switch 263 normally open, which is connected through lead 264 to power line L1 and through lead 265 to the operating coil of a relay 266 which also is connected through lead 267 to power line L2. Relay 266 when energized, closes a circuit including howler 61 and an electric lamp 269 connecting these through the relay contact points, lead 268, switch 263 and lead 264 to line L1, both the howler and the lamp being also connected to line L2. Controller 60 also controls the supply of air through line 270 to a pneumatically actuated mercury switch 271 normally closed, which is connected through lead 272 to power line L1 and through lead 273 to emergency switch 223. The controller 60 is provided with a limit lock-up head and two set pointers which function to prevent the distillation unit from starting up after it has been shut down because of low pressure, until the steam pressure has regained a pressure slightly above the minimum operating pressure. The arrangement is such that when the steam pressure supplied to the heating coil in the still falls below the determined pressure, switch 263 will be closed, and relay 266 will be energized thereby closing the circuit including howler 61 and light 269. Simultaneously switch 271 is moved to open position thereby breaking the power circuit to the unit and shutting down the unit. Simultaneously the product and slop valves are closed, the steam supplied through line 14 is shut off through the operation of controller 59, and the product pump 27 is shut down. When the steam pressure is returned to the predetermined minimum pressure, performance is restored automatically at the point where it was interrupted so that no cycle is repeated.

Still pressure controller 62 of any suitable type such as that supplied by the Foxboro company is connected to still 10 through a pressure transmitting line 274 which is controlled by a valve 275. Controller 62 controls the flow of air through an air line 276 to a pneumatically actuated mercury switch 277, normally open, which is connected by lead 278 to a relay 279 the operating coil of which is also connected by leads 280 and 281 to power line L2. Switch 277 is connected by lead 282 to power line L1. An electric lamp 283 is connected in the circuit closed by the relay 279 contact points, and in parallel with the howler 61. The contact point for the lamp is also connected by leads 226, 225 and 224 to the release coils of relays R—4 and R—5. The arrangement is such that when the pressure in still 10 exceeds a predetermined pressure, controller 62 will cause switch 277 to be closed thereby energizing relay 279 and closing the circuit through howler 61, lamp 283 and the release coils of relays R—4 and R—5. The opening of relays R—4 and R—5 prevent the unit from starting automatically after the high pressure in the still has been reduced. When the pressure in still 10 exceeds the predetermined pressure, the controller 62 functions to close the product valves and the slop valves to shut off the steam supplied to the heating coil in the still by the operation of controller 59, and to shut down the product pump 27 then in operation. The unit is put back in operation by pressing reset button 198 which causes relay R—4 to close, reopening the steam control valve 251, product valves etc. and by then pressing button 229 closing relay R—5 restarting the product pump.

The air failure alarm includes a pneumatically actuated mercury switch 284, normally open, which is connected to air line 285 which in turn is connected to the source of instrument air for the unit. Switch 284 is connected to power line L1 by lead 286 and by a lead 287 to a relay 288 which is connected through lead 289 to power line L2. Relay 288 closes the circuit of an electric lamp 290 and lead 291 which is connected to the circuit containing howler 61. Upon failure of instrument air, switch 284 will be closed, thereby energizing relay 288, causing lamp 290 to light and howler 61 to sound. At the same time the product valves and slop valves are closed and the supply of steam to the heating coil in the still is shut off through the action of control valve 251. When the air supply is regained, the performance of the unit is automatically restored at the point at which it was interrupted so that no cycle is repeated.

In the event of power failure, the solenoid 293 of a solenoid valve 292 is deenergized, this solenoid being connected to power lines L1 and L2 by leads 294 and 295. On being deenergized, the valve opens air line 296 and air is supplied to an air whistle 297. Upon power failure the product valves and slop valves are closed, the steam supplied to the heating coil of the still is shut off through the action of control valve 251 and the product pump 27 then in operation is shut down. On regaining the power supply, the performance of the unit is automatically restored at the point at which it was interrupted so that no cycle is repeated.

The vapor space of condenser 22 is connected through line 298 to a line 299, one end of which is connected to a source of isopentane vapor or refinery gas, and the other end of which is connected with the gas recovery system of the unit. Pressure indicator controller 64 of any suitable type such as supplied by the Foxboro Company, is connected to line 299 through line 300 so that variations in pressure of the vapor in line 299 will be transmitted to the controller 64. Controller 64 controls the air supplied in a line 301 to the diaphragm of a valve 302 in line 299 at the left of the juncture of lines 298 and 299, as seen in Fig. 2. Valve 302 is by-passed by a valve controlled by-pass 303. When the pressure in the line 299 and the distillation unit falls below a predetermined pressure, such as atmospheric pressure, controller 64 will operate to open valve 302.

Pressure indicator controller 63 which in this instance has two control points, has one point set for one-half pound and the other for ten pounds pressure, and is connected to line 299 through line 304. Controllers of this type are also supplied by the Foxboro Company. Controller 63 prevents the pressure in the distillation unit from exceeding the set pressures by opening the diaphragm valve 306 whenever the pressure in the line 299 rises above the set pressures. Valve 306 is by-passed by a valve controlled by-pass 307. Air lines 308 and 305' connect controller 63 with valve 237 which also connects to the air line 306' leading to the diaphragm of valve 306. Valve 237 is a three-way valve arranged so that air pressure may be transmitted to the diaphram of valve 306 so as to control the pressure in line 299 at either set point as desired. Valve 237 is actuated by a solenoid 309 which is connected through lead 310 to power line L2 and through lead 236 to relay R—8. An electric bulb 311 is connected in parallel with the coil of solenoid 309 and the lamp is connected through a switch controlled lead 312 to power line L1. In operation, with the distillation unit under pressure of isopentane vapor, when the still is charged with light aviation gasoline for example, the vapors in the unit will be compressed to about ten pounds unless the excess pressure is relieved by condensation of some of the isopentane vapors. When heat is admitted to the still and the feed begins to vaporize, it will be necessary to vent gas to keep the pressure down to ten pounds. When the temperature control point 7 is reached the control system will be reset automatically to open at one-half pound pressure by operation of the three-way solenoid operated valve 237, the position of the valve being indicated by the signal lamp 311.

A refinery gas admission line 313, has one end connected to vapor line 299 and the other end connected to the refinery gas system. Line 313 is controlled by valve 205 which is arranged to be spring pressed to open position and to be closed by a diaphragm to which air is supplied through a line 314. Valve 205 is by-passed by valve controlled line 313'. Air line 314 is controlled by valve 204 which is actuated by a solenoid 315, the coil of which is connected by lead 316 to power line L2, and is connected by lead 203 to relay R—1. A signal lamp 317 is connected in parallel with the coil of solenoid 315, and this lamp is connected to power line L1 through a switch controlled lead 318. In operation, valve 205 normally is open, and in the event the pressure in the distillation unit drops below the predetermined pressure, controller 64 will cause valve 302 to open and to admit refinery gas into the unit through line 313. Signal lamp 317 will indicate when valve 205 is open.

The supply of isopentane vapor to vapor line 299 is controlled by valve 208 which is spring pressed to closed position and which is actuated by a diaphragm to which air is supplied through line 319. Valve 208 is by-passed by valve controlled by-pass 320. Air line 319 is controlled by a valve 207 which is actuated by a solenoid 321, the coil of which is connected by lead 322 to lead 206 which connects with relay R—1, and by lead 323 to power line L2. A signal lamp 324 is connected in parallel with the coil of relay 321 and is connected through a switch controlled lead 325 to power line L1.

Figure 4:
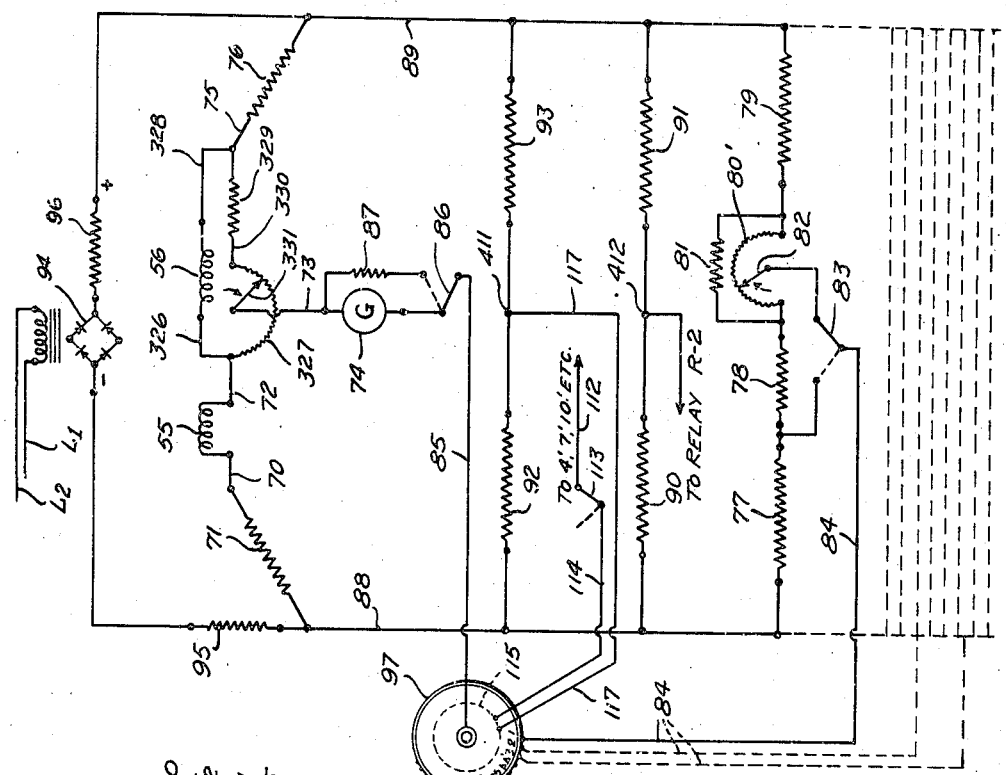
Fig. 4 is a diagrammatic view of the Wheatstone bridge arrangement of the control system.

Thermometer resistance bulb 56 is connected by a lead 326 to one end of a slide wire 327, Figs. 4 and 6, in the temperature-pressure compensator 57, and by a lead 328 to a fixed resistance 329 which is connected through a lead 330 to the other end of a slide wire 327. Slider 331 of slide wire 327 is connected through lead 73 to the galvanometer 74 of the Wheatstone bridge. Slider 331 is arranged to be moved in response to variations in pressure within the distillation unit by means of the mechanism shown in Fig. 6. The pressure of the vapors leaving the column 19 and variations therein are transmitted by a conduit 332 shown in Fig. 6 but not in Fig. 2, to a pressure measuring device comprising a manometer 333 partially filled with mercury 334, one leg of which is connected to a vacuum pump through line 335, and the other leg of which has a float 336 which actuates a gear segment 337 on a shaft 338 to which is fixed one end of a link 339, the other end of which is pivotally connected to one end of a link 340, the other end of which is pivotally connected to the lower end of an arm 341 pivoted at 342. A flapper 343 also pivoted at 342 is maintained in fixed relationship to arm 341 by an extension 344 on arm 341. The upper end of arm 341 is adjustably connected by suitable means 345 to the upper end of an indicating arm 346 which also is pivoted at 342 and moves over a scale 347. Flapper 343 regulates the flow of air through a nozzle 348 which is pivoted at 342 and to which air is supplied through flexible air line 349, the other end of which is connected to a bellows 350 to which is connected a pilot valve 351. A pointer 352 fixed to the nozzle 348 and pivoted at 342, also moves across scale 347. Pilot valve 351 moves in a housing 353 having a valve seat 354 and an opening 355 to the atmosphere, and an oppositely disposed seat 356 on a threaded plug 357 which is adjustable with respect to the housing 353 and the valve 351. The valve seat end of the plug 357 has an axial bore 358 and a connecting radial bore 359 which connects with an air passage 360 to which air is supplied through line 361, filter 362, line 363, pressure reducer 364 and line 365. A gage 366 measures the pressure of the air supplied to the device. An air line 367 has one end connected to the air passage 360 and the other end connected to air line 349, and has a reducing tube 368 therein. Valve chamber 369 is connected with an air passage 370 which is also connected through air line 371 to a diaphragm motor 372. A gage 366' measures the pressure of the air supplied to the motor 372. The diaphragm 373 of motor 372 is urged in an upward direction by a spring 374 and in a downward direction by the pressure of the air supplied through line 371. The diaphragm is connected through a strap or chain 375 to the periphery of a disc 376 fixed to a shaft 377 which is urged in a counter-clockwise direction, as viewed in Fig. 6, by a torsion spring 378 having one end fixed to a stationary point. The slider 331 of slide wire 327 is also fixed to the shaft 377 and is electrically connected to lead 73 by a wire 379. A cam 380 is mounted on shaft 377 in such manner that the angular position of the cam with respect to the axis of the shaft may be varied by a suitable adjusting mechanism including an arm 381 having one end fixed to the shaft 377 concentric with the axis of the cam, a stud 382 which is fixed to the cam eccentrically with respect to the shaft and a link 383 which extends between the outer end of arm 381 and the stud 382, the arrangement being such that adjustment in the effective length of the link 383, will vary the angular position of the cam with respect to the shaft 377. A follower 384 on the end of an arm 385 which is pivoted at its other end at 342 is fixed to the nozzle 348, causes nozzle 348 to swing about the pivot 342 upon movement of the shaft 377 by the motor 372. A spring 386 urges the cam follower into contact with the periphery of the cam. The operation is such that the float 336 operates the flapper 343 and the flapper regulates the flow of air through the nozzle 348 to control and to position the pilot valve 351 which in turn regulates the displacement of the diaphragm motor 372. The diaphragm motor produces the force which is necessary to actuate and position the slider 331 on the slide wire 327 in accordance with the periphery of the cam 380, which operates to reposition the nozzle 348 to effect a condition of equilibrium. It will be understood that a decrease in pressure in the distillation unit will move the flapper away from the nozzle thereby diminishing the pressure in bellows 350 and causing pilot valve 351 to move toward or to be seated on seat 354 thereby increasing the air pressure on the diaphram 373, moving the cam in a counter-clockwise direction, as viewed in Fig. 6, and moving the nozzle 348 toward the flapper to effect equilibrium. Increase in pressure in the distillation unit will have the opposite effect upon the pressure temperature compensating mechanism. In consequence, slider 331 will be moved with respect to the slide wire 327 in response to variations of pressure within the distillation unit, the extent of such movement being determined by the shape of cam 380. The resistance of slide wire 327 and the resistance 329 are so proportioned that when the pressure within the distillation unit is that of normal barometric pressure, the resistance of that portion of slide wire 327 to the left of the slider 331, as viewed in Fig. 4, will be exactly equal to the sum of resistance of that portion of the slide wire 327 to the right of the slider, as viewed in Fig. 4, and the resistance of fixed resistance 329, in consequence of which there will be no compensation regardless of the temperature within the distillation unit. However, when the pressure within the distillation unit is other than normal barometric pressure, slider 331 will be in contact with some other point in the slide wire 327, as a result of which the resistance on one side of the slider will be different from that on the other side, which will have the effect of placing a greater portion of the resistance of thermometer resistance bulb 56 on one side of the Wheatstone bridge than on the other, thereby influencing the balance point of the galvanometer 74 and compensating the resistance of the thermometer resistance bulb 55 for deviation of the pressure within the unit from normal barometric pressure.

Figure 5:
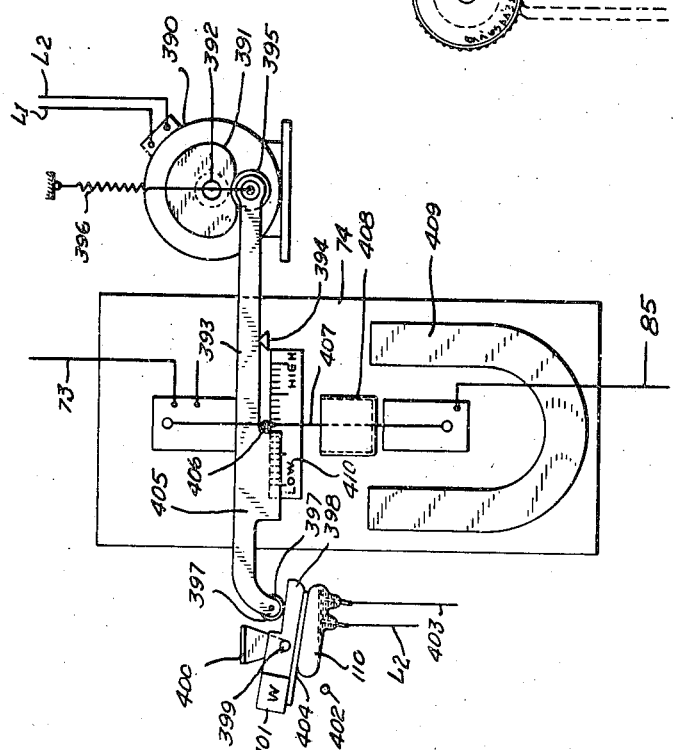
Fig. 5 is a diagrammatic view of a detail of the control system.

One means for moving the mercury switch 110 to closed position at the proper times and thereby moving the step switch 97 step by step, is shown in Fig. 5. Alternating current motor 390 which is connected across the power lines $L_1$ and $L_2$, continuously drives a cam 391 which is fixed to a shaft 392 that is driven by the motor through suitable speed reducing mechanism, not shown. A chopper bar 393 fulcrumed at 394 has a cam roller 395 at one end which is urged into contact with the periphery of cam 391 by a spring 396. The other end of the chopper bar is provided with a roller 397 which engages one end portion of a switch operating lever 398 which is pivoted at 399 to a fixed point 400, the other end of the lever 398 being provided with the weight 401 which urges the lever in a counter-clockwise direction, as seen in Fig. 5. Lever 398 actuates mercury switch 110 in such manner that when the lever is in the position shown in Fig. 5, the mercury switch is closed, and when the weight end of lever 398 is in contact with or adjacent the stop pin 402, the mercury switch will be inclined with its right hand end above its left hand end, or in the position shown in Fig. 3, and the switch will be open. Switch 110 is connected to power line $L_2$ and through lead 403 to the coil of solenoid 109 and to power line $L_1$ which actuates pawl 108 and moves the ratchet 107 which is fixed to shaft 106 of the step switch 97. Switch protecting means 404 is interposed between the mercury switch and the operating lever 398. The chopper bar 393 is provided with a downwardly extending skirt 405 intermediate the fulcrum 394 and the roller 397. The chopper bar is associated with the galvanometer 74 and with the galvanometer needle 406 which is suspended in the usual manner by a suspension wire 407 with which is associated an electromagnet 408 disposed between the poles of a permanent magnet 409. The galvanometer scale is designated 410. It will be understood that as shown in Fig. 5, the galvanometer needle extends in a direction normal to the plane of Fig. 5. The arrangement is such that as the temperature in the distillation unit measured by thermometer resistance bulb 55 approaches the temperature for which the particular slide wire 80' to $80^{24}$ then connected into the Wheatstone bridge is set, the galvanometer needle will move from the low point or left hand side toward the balanced position which is indicated in Fig. 5. When the galvanometer needle indicates a low temperature, part of the needle will be positioned directly under the skirt 405 of the chopper bar 393 and will prevent the chopper bar from closing mercury switch 110. So long as the galvanometer needle indicates a low temperature condition for the particular cut being taken off from the fractionating column, the skirt of the chopper bar will come in contact with the galvanometer needle and will prevent the chopper bar from moving to the position shown in Fig. 5 at which the mercury switch 110 is closed, and the galvanometer needle will permit the chopper bar to move downwardly to the position shown in Fig. 5 only when the galvanometer needle has moved to balanced position or to the high side to the right of the balanced position. When the needle prevents the closing of switch 110, the chopper bar will pivot about the galvanometer needle and not about the fulcrum 394.

The operation of the distillation unit and the controls is as follows: Until indicated otherwise, the description to follow will describe the steps to be taken to place the unit in condition to begin the batch distillation. Each of the slide wires 80' to 80$^{24}$ inclusive is set for the maximum temperature at which some action in the control of the distillation unit is to take place, these temperatures being set at successively increasing temperatures at which these actions are to occur automatically. Relay R—1 is in locked position which results in supplying power to solenoid 321 which controls valve 208 in the vapor line 299, thereby opening valve 208 and lighting signal lamp 324, in consequence of which isopentane vapor is admitted, through lines 299 and 298 into the condenser and into the fractionating column 19, whenever the pressure in the tower drops lower than a predetermined pressure such as one-half pound per square inch below atmospheric pressure. Pressures in the tower lower than this will result in the opening of pressure control valve 302.

At this point, each of the discs 101 to 105 inclusive of the step switch 97 has its brush at point T$_E$, and the galvanometer 74 is connected to point 411 intermediate resistances 92 and 93 of the Wheatstone bridge, which results in maintaining the galvanometer needle on the low side because the relationship of resistance 92 of the Wheatstone bridge to the resistance 93 is such that when the galvanometer is connected to point 411, there is produced the same effect as if the slide wire 80' were set for the maximum temperature. It will be understood that the resistances 92 and 93 of the Wheatstone bridge, function as holding coils to prevent the mercury switch 110 from being closed. All other relays except relay R—1, are in open position. With the brush of disc 102 on point T$_E$ signal lamp T$_E$ is lighted.

With the still 10 and the fractionating column 19 under a small superimposed gas pressure, and with water flowing through the overhead condenser 22, light aviation gasoline for example is charged to the still. The gas which is displaced by the charge is compressed to a pressure at which some of the isopentane in the system condenses.

Push button 125 is then pushed to and held in closed position which results in the energization of the operating coil of relay R—2 and closing of the relay contact points thereby connecting the galvanometer 74 to point 412 of the Wheatstone bridge (Fig. 4), which causes the galvanometer needle to swing to the high position because the resistances 90 and 91 are so proportioned that connecting in these resistances has the same effect as connecting in the slide wire with the lowest possible setting. The effect of connecting coils 90 and 91 to the galvanometer is opposite to that of connecting coils 92 and 93 to the galvanometer. With the galvanometer needle in high position, the chopper bar 393 will move downwardly and close mercury switch 110 which energizes the coil of solenoid 109 and moves the step switch 97 one step, thereby moving the brushes of the discs 101 to 105 inclusive from point T$_E$ to point T$_S$. Button 125 should be held in closed position until the chopper bar 393 can move the mercury switch 110 to closed position to cause the step switch to move to point T$_S$. Upon movement of the step switch, T$_E$ light is extinguished and T$_S$ bulb is lighted. Additionally, push button 127 is connected to the power line and button 125 is disconnected therefrom, thereby deenergizing relay R—2 and disconnecting release coils 90 and 91 from the galvanometer, holding coils 92 and 93 remaining connected to the galvanometer.

Button 127 is then pressed to closed position which energizes the coil in relay R–3, closing this relay, which reconnects the galvanometer to coils 90 and 91 and simultaneously closes an electrical lock-up contact in relay R–3, also simultaneously closing relay R–4 which locks up mechanically by means of any suitable mechanism, and supplies power to push button 229 and to solenoid 256 of valve 255 controlling the air line to valve 251, which turns on the steam to the heating coil 13 in still 10 under the control of flow controller 59 and lights bulb 259, and also simultaneously supplies power to step switch discs 103, 104 and 105. As soon as the chopper bar 393 is permitted to move to its lowermost position and closes mercury switch 110, step switch 97 is moved from point T$_S$ to point T$_O$ which disconnects the power from button 127 and from the electrical lock-up of the coil of relay R–3, thereby releasing an opening relay R–3 and disconnecting the galvanometer from coils 90 and 91, holding coils 92 and 93 remaining connected to the galvanometer. Simultaneously bulb T$_S$ is extinguished and bulb T$_O$ is lighted and one side of the power line is connected to time delay mechanism TD–1. At the same time power is supplied to the solenoid of valve 134, thereby admitting air at a predetermined control pressure controlled by air pressure reducing valve 151 to product flow recorder controller 137, thereby setting the control point for this controller and opening controlled valve 139. Simultaneously bulb 153 is lit.

With steam flowing to the steam coil 13 in the batch still 10, the temperature of the feed will rise to the vaporization point, displaced gas in the system above the liquid will build up to an equilibrium pressure and any excess gas will be vented off through line 299 through valve 306 controlled by controller 63 at ten pounds gage, for example. With vapors rising continuously from the still, ascending through the column 19, condensing in the overhead condenser 22, and with condensate returning through the column 19, an observation will be made of the rate of condensate returning to the still by indication of flow at flow indicator 44. When this flow indicator indicates that a predetermined rate of flow has been attained and sufficient fluid is available in the suction of one of product pumps 27, that pump is then started by pressing push button switch 229 which connects the starter equipment 244 to the power line. At this stage of the operation, pressure indicating controller 63 is set to maintain a maximum pressure of ten pounds gage. The closing of push button 229 results in the supplying of power to push button 240 and in energizing relay R–5 which locks up mechanically to maintain the circuit supplying power to the motor starting equipment. Product pumps 27 may be driven by an electric motor which is controlled by the combination magnetic starting switch and a de-ion circuit breaker. The starting switch may be manually operated by a start-stop push button switch, one located at the pump motor and one located at the switch structure. Additionally, a manual-automatic switch may be provided for each starter on the switch structure. The function of these switches is to place the starter controlling the motor either in manual operating position or in automatic operating position. Push button 229 will start the pump 27 when the manual-automatic switch is on automatic position. In order to prevent both of the pumps 27 from operating at the same time, a transfer switch may be located on the switch structure so that only one of the pumps can be operated automatically by push button 229. Product pump 27 will be started against a closed discharge, vented and brought to full differential head. After the pump has been vented, one hand control valve 413 in the discharge lines from the pumps 27, is opened slowly at first and thereafter is opened wide when the operation is satisfactory. The rate of flow of product through line 30 is controlled by the flow recorder controller 137 through valve 139. As previously mentioned, the reflux flow rate in column 19 is varied automatically as required by the stage of the distillation. This is accomplished by controlling the rate of flow of the product from the unit, thereby indirectly controlling the rate of flow of the balance of the condensate downwardly through the column 19.

The distillation unit is now ready to be put on automatic control. Push button 249 is pressed to closed position which energizes relay R–9, locking up electrically, and feeds power to timer TD–1, starting the timing operation and simultaneously energizing the solenoid of valve 177 which controls slop valve 42, thereby admitting air to the diaphragm of valve 42 and opening this valve and lighting bulb 179. At the expiration of the time delay period, the circuit of the solenoid of valve 177 is broken and valve 177 closed and bulb 179 is extinguished, and a second circuit in TD–1 is established which energizes relay R–6 thereby reconnecting the galvanometer 74 to the resistance coils 90 and 91 in the Wheatstone bridge, moves step switch one step from point To to point 1, simultaneously disconnects power from TD–1 which then resets, turning out To light, lighting point 1 light, also connecting galvanometer 74 to slide wire 8', simultaneously energizing the solenoid of valve 159, controlling the air line to product valve 161 in line 31, thereby admitting air to the diaphragm of valve 161 and opening this valve and lighting bulb 164.

As the temperature is approached for which slide wire 80' is set, the needle of galvanometer 74 moves from the low point toward the balanced position and when the set temperature is reached, the galvanometer needle will be in balanced position, permitting chopper bar 393 to close mercury switch 110 and moving step switch 97 from control point 1 to control point 2, thereby disconnecting the galvanometer from slide wire 80' and connecting it to slide wire 80², simultaneously extinguishing light 1 and lighting the bulb for control point 2, deenergizing the solenoid of valve 134 and energizing the solenoid of valve 144 thereby connecting controlled air pressure through valve 144 to the controller 137 and resetting the control point thereof for reflux rate #2. Bulb 153 will be extinguished and the bulb for reflux rate #2 will be lighted. No change will be made in the product valves or the slop valves.

When the set point on slide wire 80² is reached, the step switch 97 is moved to control point #3, connecting slide wire 80³ to the Wheatstone bridge and disconnecting slide 80² therefrom, simultaneously lighting bulb 3 and extinguishing bulb 2, resetting controller 137 for reflux rate #3, extinguishing the bulb for reflux rate #2 and lighting the bulb for reflux rate #3. No change is made in the product valves or the slop valves.

When the set point on slide wire 80³ is reached, the galvanometer is disconnected from slide wire 80³ and is connected to the holding coils 92 and 93, thereby holding the galvanometer needle on the low setting, step switch 97 is moved to control point 4', control point bulb 3 is extinguished and bulb 4 is lighted, reflux rate is changed from rate #3 to #1, reflux rate #3 light is extinguished and #1 light is lighted, time delay TD–2 is energized which holds product valve 161 open for a predetermined period of time to clear pipe 26, pump 27, pipe 28, cooler 29 and pipe 30 which clears the product lines up to the product valve manifold of product 1. At the expiration of the set time period, TD–2 energizes the coil of relay R–7 which locks up mechanically and opens one side of the power line to the product valve solenoids thereby venting air from the diaphragm of product valve 161 and closing this valve at the same time extinguishing light 164. Simultaneously time delay mechanism TD–3 is energized, thereby energizing the solenoid of valve 190, admitting air to the diaphragm of slop valve 43 and opening this valve. At the same time bulb 192 is lit. At the expiration of the set time of TD–3, the solenoid of valve 190 is deenergized, the valve is closed, and bulb 192 is extinguished, release coil of relay R–7 is energized thereby opening relay R–7, the coil of relay R–6 is energized, closing this relay, and connecting the galvanometer to coils 90 and 91 in addition to the coils 92 and 93, causing the step switch 97 to move the step switch to point 4, deenergizing TD–2 and TD–3 thereby allowing these timers to reset and to restore power to lead 233 thus permitting the proper product valve to open, simultaneously connecting slide wire 80⁴ in the Wheatstone bridge, opening the valve controlling product #2, lighting the bulb for product #2, also energizing the release coil of relay R–1 and opening this relay, deenergizing the coil of solenoid 321 which results in the closing of valve 208 in vapor line 299, extinguishing bulb 324, simultaneously energizing the coil of solenoid 315, permitting air from the diaphragm of valve 205 to escape through valve 204 to the atmosphere, opening valve 204 and lighting bulb 317.

The operation of the control system at control point 4 is like the operation at control point 1. The operation at point 5 is like point 2, the operation at point 6 is like the operation at point 3, and the operation at point 7' is like the operation at point 4'.

The operation at control point 7 is the same as the operation at control point 1 excepting that relay R–8 is energized and is locked up mechanically, which results in the energization of solenoid 309 controlling valve 237 in the air line to which pressure indicator controller 63 is connected, thereby moving valve 237 and resetting controller 63 from the control point set for ten pounds to the control point set for one-half pound gage, at the same time lighting bulb 311. It will be understood that this operation occurs only at control point 7.

Thereafter the operations previously described are repeated in their proper order until the end of the batch distillation run.

When the temperature in the distillation unit rises to the point set on slide wire $80^{24}$, step switch 97 will move as previously described from control point 24 to control point 25' which disconnects the galvanometer from slide wire $80^{24}$ and connects galvanometer 74 to the holding coils 92 and 93 thereby preventing the step switch from moving further. Simultaneously the light 24 is extinguished, the solenoid of valve 148 controlling reflux rate #3 is deenergized, extinguishing the bulb for reflux rate #3, and the solenoid of valve 134 is energized, lighting bulb 153 for reflux rate #1, and changing the control point setting of the controller 137 to change the reflux rate from the #3 rate to the #1 rate. Also simultaneously TD—2 is energized and at the end of the time delay period, relay R—7 is energized and locks up mechanically and disconnects the power line from the product valves, closing the product valve in line 38 and extinguishing product #8 light, energizing timer TD—3, opening slop valve 48 and lighting bulb 192. At the end of the time delay period, slop valve 48 is closed and bulb 192 extinguished, the release coil of relay R—7 is energized, causing this relay to release and open, and simultaneously the coil of relay R—6 is energized, connecting the galvanometer also to the coils 90 and 91, causing step switch 97 to move from control point 25' to point $T_E$ which again connects the galvanometer to the holding coils 92 and 93, lighting bulb $T_E$, energizing the release coils of relays R—4 and R—5, opening these relays and deenergizing the motor starting equipment 244 thereby stopping the product pump 27 then in operation, simultaneously deenergizing solenoid 256 thereby closing valve 255 in air line 253 which controls valve 251 in steam line 14, closing valve 251, extinguishing bulb 259 and shutting off the supply of steam to the coil 13, also deenergizing relay R—9, allowing this relay to open, also simultaneously deenergizing the coil of solenoid valve 134, controlling reflux rate #1, extinguishing bulb 153, closing the flow control valve 139 in product line 30, simultaneously energizing the relay R—1 which locks up mechanically and deenergizes the solenoid 315, causing valve 205 to close, extinguishing bulb 317, energizing the solenoid 321, opening valve 208, lighting bulb 324, also simultaneously energizing release coil of relay R—8, thereby opening the relay, deenergizing solenoid 309, permitting controller 63 to reset from one half pound control to ten pounds control, extinguishing bulb 311 and simultaneously connecting push button 125 to the power line. At this point the control system has completed its operation for the batch distillation run.

In the event of high still pressure, the release coils of relays R—1 and R—2 will be energized and shut down the unit by shutting off the steam and shutting down the product pump. The howler 61 is simultaneously sounded and light 283 lit until the still pressure drops below the set point of controller 62. To start up the unit again reset button 198 must be moved to closed position to reenergize relay R—4, after which push button 229 is moved to closed position to reenergize relay R—5 and to put the distillation unit back in operation on automatic control.

In the event of low steam pressure, mercury switch 263 is closed and mercury switch 271 is opened. The first operation results in the sounding of howler 61 and the lighting of bulb 269, the second operation resulting in the deenergization of most of the control system including coil 256 and the motor starter coils, shutting down the unit excepting that relays R—4 and R—5 are not released so that the unit will start up again automatically on the restoration of normal steam pressure. Power failure has the same effect on the unit and also deenergizes solenoid 293 admitting air to whistle 297 causing the same to sound. Air failure closes the steam and product valves due to the release of the air pressure controlling these valves, inasmuch as all of these valves are of the type that are opened under air pressure and are closed when the pressure is released. Air failure also allows mercury switch 284 to close energizing relay 288 causing the howler 61 to sound and bulb 290 to light.

Any power interruption will deenergize solenoid 315 and open valve 205. This valve is also opened upon air failure.

Continuous batch distillation may be carried out with the apparatus disclosed hereinbefore, by charging the still through line 11, Fig. 1, by pump 12, and by employing a control device 415 which is responsive to the level of liquid in the still to control a valve 416 in the feed line. Continuous batch distillation operation is particularly applicable in cases where a substantial portion of the charge to the distillation unit, consisting of the lighter boiling constituents, may be removed as a single fraction. The charge is fed to the still 10 at a rate such that the first light cut is fed to the still at a rate substantially equal to the rate at which it is removed from the still by fractional distillation. The desired charge rate is controlled and maintained by flow recorder controller 421 which controls the setting of control valve 420. The still is heated at the desired rate substantially constantly during the entire distillation period. This operation is the equivalent of a continuous shell still operation in which the residue is accumulated in the still and this accumulation continues until the liquid in the still reaches a predetermined level, at which the controller 415 closes valve 416 and cuts off the supply of feed to the still. After the feed is cut off, the distillation continues as a discontinuous batch operation in the manner described hereinbefore in connection with the batch distillation operation. The temperature at the top of the tower gradually rises, and the level of the temperature of the vapors at the top is employed as a basis for the automatic control of the distillation operation, regulating the reflux ratios by predetermined steps and controlling the product line valves so as to produce the desired products in the desired degrees of purity, all in the manner hereinbefore disclosed. The same automatic safety devices as previously disclosed are employed, and the heating steam is automatically shut off and the unit shut down automatically at the end of the run as previously described.

In lieu of changing the reflux ratio when certain predetermined temperatures are reached, as previously described, the reflux to the column may be regulated automatically and continuously in response to the temperature at the base of the column so as to produce an overhead product of the desired purity, while using at all times the minimum permissible reflux ratio. By so controlling the reflux, a specified overhead product can be produced with the absolute minimum amount of heat consumed in boiling the liquid in the still. This method of operation is particularly applicable to the close fractionation of a two-component mixture. An equation can be determined which will indicate the reflux ratio required to produce an overhead product of any specified purity, expressed in terms of the composition of the vapor entering the base of the fractionation column as feed. This composition, in the case of a two-component mixture, can be expressed readily in terms of temperature, in consequence of which it is possible to calculate an equation expressing reflux ratio required as a function of the temperature at the base of the tower. Operating in accordance therewith, a thermometer resistance bulb 417 is located at the bottom portion of the tower, and is connected through suitable mechanism in the control system to the controller 137 for reflux control valve 139, the mechanism being operative to provide that reflux ratio which will produce the overhead product desired with the minimum permissible reflux ratio. One form of such mechanism would be similar to the pressure-temperature compensator hereinbefore described, containing a cam of suitable shape which in this case would be operated in response to variations in temperature of thermometer resistance bulb 417 functioning so as to reset the control mechanism of flow recorder controller 137. A second thermometer resistance bulb, like bulb 55, will be utilized to shut down the unit automatically as soon as all of the lighter constituent of the desired purity has been removed from the still. When this point has been reached, and the maximum reflux ratios are being used, the temperature will begin to rise above a point which will correspond to overhead product of acceptable purity, and the control system will operate automatically and immediately to shut down the unit, the end of the run having been reached. This method of operation may be employed either with a distillation unit in which the still is charged completely before the heat is turned on as previously described in connection with the discontinuous batch distillation method, or it can be used with a continuous batch unit as described previously, in which the charge is slowly pumped into the still while the still is being heated at a predetermined rate. This method of operation also may be applied to multiple component distillation by providing a suitable mechanical and electrical mechanism for the resetting of flow recorder controller 137 for each individual product, these mechanisms being connected at the proper stage of the distillation in substantially the same manner as the several slide wires previously described.

In another method of automatic continuous batch distillation, the rate of charging of the still is controlled by a flow recorder controller which is reset as necessary so as to maintain a constant temperature of the liquid within the still up to the time that the charge of the still is terminated as a result of the level in the still having reached a predetermined point. The operation of the unit will be substantially as follows: Starting with an empty still, the steam will be admitted into the heating coil 13 (Fig. 1) through the steam line 14, the rate of admission of the steam being controlled by a control valve 251 in response to the action of a flow recorder controller 419 similar to controller 59 with the addition of a mechanism responsive to the temperature of thermometer resistance bulb 422 located in the still which operates to reset the control setting of flow recorder controller 421. The charge to the still will be pumped into the unit through feed line 11 by feed pump 12, the rate of flow being controlled by a valve 420, the opening of which is controlled by a flow recorder controller 421 similar to controller 59. As the charge to the still is heated, a portion of it is vaporized, the vapors passing into column 19 and flowing counter-current to and in contact with reflux, and a portion of the condensate of the overhead vapors is withdrawn through line 26 and pumped by pump 27 through line 28 and cooler 29 to product line 30. The balance of the condensate of the overhead vapors, after passing downwardly through the column 19, returns to the still 10 through reflux return line 40. A thermometer resistance bulb 422 which is immersed in the liquid within the still 10, is connected through the control system by suitable mechanical and electrical means similar to that previously disclosed, to the flow recorder controller 421 in such manner as to control the rate of admission of feed to the still by control valve 420 to maintain a substantially constant temperature within the still. The control system will be set so that the temperature within the still is maintained at a point corresponding to partial vaporization of the feed. In consequence, the level of the liquid within the still will increase continually until eventually the level therein reaches a predetermined point, at which the liquid level controller 415 will operate to close valve 416 in feed line 11 and terminate the flow of feed into the still. As soon as the flow of feed into the still is cut off, the temperature of the liquid in the still will begin to rise and it will no longer be possible for the flow recorder controller 421 to control the temperature of the liquid within the still. As the temperature of the liquid in the still rises, the composition of the vapors leaving the still will change, becoming more concentrated in heavier constituents than previously. Up to this time the relationship between the quantity of reflux liquid withdrawn through line 26 as product and the reflux liquid returned through the column will have been controlled by flow recorder controller 137 operating through valve 139, so that the composition of the product will have remained substantially constant, and the temperature of the vapors leaving the top of the column, as indicated by thermometer resistance bulb 55, will have remained substantially constant.

As soon as the temperature of the vapors entering the base of column 19 begins to rise, the temperature at the top of the column also will tend to rise. As the temperature at the top of the column reaches predetermined temperature levels, the control system will operate so as to reset flow recorder 137 thereby changing the setting of control valve 139 and, by decreasing the rate of flow of product through line 30, will increase the reflux ratio within the fractionating column, thereby tending to prevent the temperature at the top of the column from increasing.

When the temperature at the top of the column reaches a predetermined temperature which corresponds to the exhaustion of the lightest boiling constituent from the still feed, the control system will operate to close control valve 161 in product line 31, simultaneously opening control valve 161' in product line 32, thereby terminating the flow of product #1 from the column and beginning the flow of product #2 through line 32. The distillation then continues with the temperature at the top of the column rising and with the control system having reset flow recorder controller 137, thereby changing the position of valve 139 to permit an increase in the rate of flow of product through line 30, valve 161' and line 32 to the tank collecting product #2. As the temperature continues to rise, the control system, at fixed temperature points, resets the flow controller 137 and changes the setting of the valve 139, thereby altering the reflux ratio within the column and tending to prevent a rise in the temperature at the top of the column. This will continue in the manner previously described, until a final temperature is reached at the top of the column, at which point the control system will close valve 161' and open valve 161" in product line 33, thereby terminating the flow of product #2 and initiating flow of product #3. It will be understood that as many products as desired may be produced by a continuation of this procedure.

In accordance with another method of control, a third thermometer resistance bulb 426, Fig. 1, is placed in the vapor stream leaving the top of the column, which will operate to reset flow recorder controller 137 thereby varying the rate of flow of product from the unit and continuously controlling the reflux ratio within the unit, increasing the reflux ratio as the temperature in the top of the column tends to rise until a maximum allowable reflux ratio is attained. After the maximum allowable reflux ratio is attained, the temperature of the vapors leaving the top of the column will rise and thermometer resistance bulb 55, Fig. 2, will operate as described previously to open slop valve 48 and complete the operating cycle in the case of two-component distillation, or to connect in a new slide wire and continue the distillation operation in the case of multiple component distillation.

A further method of control utilizes thermometer resistance bulb 55 as the means of resetting flow recorder controller 137 and controlling the reflux ratio within the fractionating column, causing the reflux ratio to increase substantially continuously as the distillation of a particular component progresses until a predetermined maximum reflux ratio is obtained, at which time the control mechanism operates to terminate the distillation as described previously in the case of a single component distillation, or to terminate the production of one product and connect in another slide wire for the production of another product in the case of multiple-component distillation.

Use of the apparatus and the methods of control herein disclosed, make possible the production of products more closely fractionated than has been possible heretofore in the art on a commercial scale, and also makes possible the production of products of normal degree of purity, with a lower consumption of heat and other utilities than has been possible hitherto.

The present application is a continuation of application Serial No. 389,756 filed April 22, 1941, and which is now abandoned.

Inasmuch as changes may be made in the form, location and relative arrangement of the several parts of the apparatus disclosed, and changes may be made in the several steps of the methods disclosed and in their sequence, and certain parts of the apparatus disclosed and certain method steps disclosed may be omitted, if desired, without materially altering the function or operation of the parts of steps remaining, it will be understood that the invention is not to be limited excepting by the scope of the appended claims.

What is claimed is:

1. Apparatus for the batch distillation of composite liquid comprising a still, a fractionating column, means for supplying heat to the still, means for introducing into the lower part of the column liquid vaporized in the still, means in the column for passing vapors of the liquid counter-current to and in contact with reflux, means for condensing substantially all of the overhead vapors and returning part of the condensate to the column as reflux, a conduit through which product distillate is withdrawn from the column, a valve in said conduit for controlling the rate at which product distillate is withdrawn from the column thereby controlling the reflux rate, temperature responsive means in the path of flow of the overhead vapors, control means actuated by the temperature responsive means to control the valve in the conduit during the production of a distillate fraction, said control means being operative in response to said temperature responsive means to maintain the withdrawal rate of the product distillate constant at each of successively different increasing values between said temperature limits and, until production of the fraction is completed, to decrease the withdrawal rate of the product distillate abruptly from a higher to a succeeding lower value when predetermined distillate vapor temperatures are successively reached, and pressure responsive means to the pressure of the distillate vapors for compensating the response of the temperature actuated control means for deviations of the pressure of the distillate vapors from a predetermined pressure.

2. Apparatus for the batch distillation of composite liquid comprising a still, a fractionating column, means for supplying heat to the still, means for introducing into the lower part of the column liquid vaporized in the still, means in the column for passing vapors of the liquid counter-current to and in contact with reflux, means for condensing substantially all of the overhead vapors and returning part of the condensate to the column as reflux, a conduit through which product distillate is withdrawn from the column, a valve in said conduit for controlling the rate at which product distillate is withdrawn from the column thereby controlling the reflux rate, temperature responsive means in the path of the overhead vapors, control means actuated by the temperature responsive means to control the valve in the conduit during the production of a distillate fraction, said control means being operative in response to said temperature responsive means to maintain the reflux ratio constant at each of successively different increasing values between said temperature limits and, until production of the fraction is completed, to increase the reflux ratio abruptly from a lower to a higher succeeding value when predetermined distillate vapor temperatures are successively reached, and pressure responsive means responsive to the pressure of the distillate vapors for compensating the response of the temperature actuated control means for deviations of the pressure of the distillate vapors from a predetermined pressure.

3. Apparatus for the batch distillation of composite liquid comprising a still, a fractionating column, means for supplying heat to the still, means for introducing into the lower part of the column liquid vaporized in the still, means in the column for passing vapors of the liquid counter-current to and in contact with reflux, means for condensing substantially all of the overhead vapors and returning part of the condensate to the column as reflux, a conduit through which product distillate is withdrawn from the column, a valve in said conduit for controlling the rate at which product distillate is withdrawn from the column thereby controlling the reflux rate, temperature responsive means in the path of the overhead vapors, control means actuated by the temperature responsive means to control the valve in the conduit during the production of a distillate fraction, said control means being operative in response to said temperature responsive means to maintain the withdrawal rate of the product distillate constant and to maintain the reflux ratio constant at each of successively different values between said temperature limits and, until production of the fraction is completed, to increase the reflux ratio abruptly from a lower to a higher successive value and to decrease the withdrawal rate of the product distillate abruptly from a higher to a lower successive value when predetermined temperatures are successively reached, and pressure responsive means responsive to the pressure of the distillate vapors for compensating the response of the temperature actuated control means for deviations of the pressure of the distillate vapors from a predetermined pressure.

4. Apparatus for the batch distillation of composite liquid comprising a still, a fractionating column, means for supplying heat to the still, means for introducing into the lower part of the column liquid vaporized in the still, means in the column for passing vapors of the liquid counter-current to and in contact with reflux, means for condensing substantially all of the overhead vapors and returning part of the condensate to the column as reflux, a conduit through which product distillate is withdrawn from the column, a valve in said conduit for controlling the rate at which product distillate is withdrawn from the column thereby controlling the reflux rate, a plurality of product lines connecting with said conduit and each having a valve therein, temperature responsive means in the path of the overhead vapors, control means actuated by the temperature responsive means to control the valve in the conduit during the production of a distillate fraction, said control means being operative in response to the temperature responsive means to maintain the reflux ratio constant at each of successively different increasing values between said temperature limits and, until production of the fraction is completed, to increase the reflux ratio abruptly from a lower to a higher successive value when predetermined temperatures are successively reached, and other means operative in response to said control means for successively opening the valves in the product lines one at a time and closing the open valve prior to opening another valve in the product lines.

5. Apparatus for the batch distillation of composite liquid comprising a still, a fractionating column, means for supplying heat to the still, means for introducing into the lower part of the column liquid vaporized in the still, means in the column for passing vapors of the liquid counter-current to and in contact with reflux, means for condensing overhead vapors and returning condensate to the column as reflux, a conduit through which product distillate is withdrawn from the column, a valve in said conduit for controlling the rate at which product distillate is withdrawn from the column thereby controlling the reflux rate, a thermometer resistance bulb in the path of said overhead vapors, a Wheatstone bridge including a galvanometer, said bulb being connected between fixed resistances in one side of the Wheatstone bridge, a plurality of slide wires of different resistances and each having a slider in contact therewith, first electrical switch means for selectively connecting the slide wires into the Wheatstone bridge between fixed resistances in the other side of the bridge and disconnecting them therefrom, one side of the galvanometer being connected to said bulb and the other side being connected to the sliders of said slide wires, and second electrical switch means operative simultaneously with the first switch means for regulating the setting of the valve in said conduit thereby to control the reflux rate.

6. Apparatus for the batch distillation of composite liquids comprising a still, a fractionating column, means for supplying heat to the still, means for introducing into the lower part of the column liquid vaporized in the still, means in the column for passing vapors of the liquid counter-current to and in contact with reflux, means for condensing substantially all of the overhead vapors and returning part of the condensate to the column as reflux, a conduit through which product distillate is withdrawn from the column, a valve in said conduit for controlling the rate at which product distillate is withdrawn from the column thereby controlling the reflux rate, a plurality of product lines connecting with said conduit and each having a valve therein, a temperature measuring device in the path of said overhead vapors, means operative in response to said device for regulating the setting of the valve in said conduit thereby to control the reflux rate, other means operative in response to said device for controlling the valves in said product lines, a second temperature measuring device in the path of said overhead vapors, and means operative in response to said last mentioned device for compensating the response of the first mentioned device for deviations of the pressure of the overhead vapors from a predetermined pressure.

7. Apparatus for the batch distillation of composite liquids comprising a still, a fractionating column, means for supplying heat to the still, means for introducing into the lower part of the column liquid vaporized in the still, means in the column for passing vapors of the liquid counter-current to and in contact with reflux, means for condensing overhead vapors and returning condensate to the column as reflux, a conduit through which product distillate is withdrawn from the column, a valve in said conduit for controlling the rate at which product distillate is withdrawn from the column thereby controlling the reflux rate, a plurality of product lines connecting with said conduit and each having a valve therein, a thermometer resistance bulb in the path of said overhead vapors, a Wheatstone bridge including a galvanometer, said bulb being connected between fixed resistances in one side of the Wheatstone bridge, a plurality of slide wires of different resistances and each having a slider in contact therewith, first electrical switch means for selectively connecting the slide wires into the Wheatstone bridge between fixed resistances in the other side of the bridge and disconnecting them therefrom, one side of the galvanometer being connected to said bulb and the other side being connected to the sliders of said slide wires, second electrical switch means operative simultaneously with the first switch means for regulating the setting of the valve in said conduit thereby to control the reflux rate, and third electrical switch means operative simultaneously with said other switch means for controlling the valves in said product lines.

8. Apparatus for the batch distillation of composite liquids comprising a still, a fractionating column, means for supplying heat to the still, means for introducing into the lower part of the column liquid vaporized in the still, means in the column for passing vapors of the liquid counter-current to and in contact with reflux, means for condensing overhead vapors and returning condensate to the column as reflux, a conduit through which product distillate is withdrawn from the column, a valve in said conduit for controlling the rate at which product distillate is withdrawn from the column thereby controlling the reflux rate, a plurality of product lines connecting with said conduit and each having a valve therein, a thermometer resistance bulb in the path of said overhead vapors, a Wheatstone bridge including a galvanometer, said bulb being connected between fixed resistances in one side of the Wheatstone bridge, a plurality of slide wires of different resistances and each having a slider in contact therewith, first electrical switch means for selectively connecting the slide wires into the Wheatstone bridge between fixed resistances in the other side of the bridge and disconnecting them therefrom, means for compensating the temperature measurement for variations of pressure in the column comprising another slide wire connected to said bulb and between said fixed resistances in said one side of the Wheatstone bridge, a slider movable in contact with said other slide wire and connected to one side of the galvanometer, the other side of the galvanometer being connected to the sliders of the first mentioned slide wires, a second thermometer resistance bulb connected in parallel with said other slide wire, a member comprising a movable pneumatic nozzle, another member comprising a flapper arranged to oppose the escape of air from the nozzle and movable with respect thereto, means for moving one member in response to variations in pressure in the column, a cam, means for moving the cam in response to variations in the relative positions of the nozzle and the flapper, the movement of the other member being controlled by the movement and contour of the cam, means for moving the slider associated with said other slide wire with the cam, second electrical switch means operative simultaneously with the first switch means for regulating the setting of the valve in said conduit thereby to control the reflux rate, and third electrical switch means operative simultaneously with said other switch means for controlling the valves in said product lines.

9. Apparatus for the batch distillation of composite liquids comprising a still, a fractionating column, means for supplying heat to the still, means for introducing into the lower part of the column liquid vaporized in the still, means in the column for passing vapors of the liquid counter-current to and in contact with reflux, means for condensing overhead vapors and returning condensate to the column as reflux, a conduit through which product distillate is withdrawn from the column, a valve in said conduit for controlling the rate at which product distillate is withdrawn from the column thereby controlling the reflux rate, a plurality of product lines connecting with said conduit and each having a valve therein, a plurality of slop lines connecting with said conduit and each having a slop valve therein, a thermometer resistance bulb in the path of said overhead vapors, a Wheatstone bridge including a galvanometer, said bulb being connected between fixed resistances in one side of the Wheatstone bridge, a plurality of slide wires of different resistances and each having a slider in contact therewith, first electrical switch means for selectively connecting the slide wires into the Wheatstone bridge between fixed resistances in the other side of the bridge and disconnecting them therefrom, means for compensating the temperature measurement for variations of pressure in the column comprising another slide wire connected to said bulb and between said fixed resistances in said one side of the Wheatstone bridge, a slider movable in contact with said other slide wire and connected to one side of the galvanometer, the other side of the galvanometer being connected to the sliders of the first mentioned slide wires, a second thermometer resistance bulb connected in parallel with said other slide wire, a member comprising a movable pneumatic nozzle, another member comprising a flapper arranged to oppose the escape of air from the nozzle and movable with respect thereto, means for moving one member in response to variations in pressure in the column, a cam, means for moving the cam in response to variations in the relative positions of the nozzle and the flapper, the movement of the other member being controlled by the movement and contour of the cam, means for moving the slider associated with said other slide wire with the cam, second electrical switch means operative simultaneously with the first switch means for regulating the setting of the valve in said conduit thereby to control the reflux rate, third electrical switch means operative simultaneously with said other switch means for controlling the valves in said product lines, fourth electrical switch means operative simultaneously with said other switch means for controlling said slop valves, relay means electrically associated with certain of said switch means, and time delay mechanisms associated with the switch means controlling the product valves and slop valves.

10. Apparatus for the batch distillation of composite liquids comprising a still, a fractionating column, means for supplying heat to the still, means for introducing into the lower part of the column liquid vaporized in the still, means in the column for passing vapors of the liquid counter-current to and in contact with reflux, means for condensing overhead vapors and returning condensate to the column as reflux, a conduit through which product distillate is withdrawn from the column, a valve in said conduit for controlling the rate at which product distillate is withdrawn from the column thereby controlling the reflux rate, a plurality of product lines connecting with said conduit and each having a valve therein, a plurality of slop lines connecting with said conduit and each having a slop valve therein, a thermometer resistance bulb in the path of said overhead vapors, a Wheatstone bridge including a galvanometer, said bulb being connected between fixed resistances in one side of the Wheatstone bridge, a plurality of slide wires of different resistances and each having a slider in contact herewith, first electrical switch means for selectively connecting the slide wires into the Wheatstone bridge between fixed resistances in the other side of the bridge and disconnecting them therefrom, one side of the galvanometer being connected to said bulb and the other side being connected to the sliders of said slide wires, second electrical switch means operative simultaneously with the first switch means for regulating the setting of the valve in said conduit thereby to control the reflux rate, third electrical switch means operative simultaneously with said other switch means for controlling the valves in said product lines, fourth electrical switch means operative simultaneously with said other switch means for controlling said slop valves, relay means electrically associated with certain of said switch means, and time delay mechanisms associated with the switch means controlling the product valves and slop valves.

LESLIE B. BRAGG.
CHARLES A. SCHWARZLER.
CUTHBERT J. BROWN.

REFERENCES CITED

The following references are of record in the file of this patent:

UNITED STATES PATENTS

| Number | Name | Date |
|---|---|---|
| 1,856,471 | Denig | May 3, 1932 |
| 1,872,879 | Brandt | Aug. 23, 1932 |
| 2,017,820 | Schultze | Oct. 15, 1935 |
| 2,069,490 | Fenske | Feb. 2, 1937 |
| 2,249,461 | Diwoky | July 15, 1941 |
| 2,250,946 | Brown | July 29, 1941 |

FOREIGN PATENTS

| Number | Country | Date |
|---|---|---|
| 728,957 | France | Apr. 19, 1932 |

OTHER REFERENCES

Fenske et al., "Composition of . . . Gasoline"; Ind. and Eng. Chem.; vol. 24, No. 4; April 1932; pages 408–418.

Masoncilan Bulletin No. 3000–c; "Compensated Temp. Control Instruments"; 1933; pages 4, 6, 7 and 14.

Robinson, "Elements of Fractional Distillation," McGraw-Hill; 1930; second ed., pages 70–74 and 94–100.

Certificate of Correction

Patent No. 2,476,280                                                                    July 19, 1949

LESLIE B. BRAGG ET AL.

It is hereby certified that errors appear in the printed specification of the above numbered patent requiring correction as follows:

Column 19, line 49, for "wire 0'"'" read *wire 80'*; column 26, line 31, after the word "means" insert *responsive*;

and that the said Letters Patent should be read with these corrections therein that the same may conform to the record of the case in the Patent Office.

Signed and sealed this 25th day of April, A. D. 1950.

[SEAL]

THOMAS F. MURPHY,
                                                        *Assistant Commissioner of Patents.*